Aug. 25, 1959 — R. W. LORTZ — 2,900,998
CHECK VALVE
Filed Dec. 1, 1955 — 2 Sheets-Sheet 1

INVENTOR.
R. W. LORTZ
BY Hudson and Young
ATTORNEYS

Aug. 25, 1959 R. W. LORTZ 2,900,998
CHECK VALVE
Filed Dec. 1, 1955 2 Sheets-Sheet 2

INVENTOR.
R. W. LORTZ
BY Hudson and Young
ATTORNEYS

United States Patent Office 2,900,998
Patented Aug. 25, 1959

2,900,998

CHECK VALVE

Russell W. Lortz, Sweeny, Tex., assignor to Phillips Petroleum Company, a corporation of Delaware Application December 1, 1955, Serial No. 550,340

7 Claims. (Cl. 137—515.3)

This invention relates to a check valve. In one aspect, this invention relates to a pivoted disk check valve. In another aspect, this invention relates to increasing the moment of inertia of the disk in a pivoted disk check valve.

Check valves have been employed in pipe lines for many years to control the flow of fluids through said pipe lines. They are commonly employed to prevent the backflow of fluid when for some reason the force, upstream of the valve, which is moving the fluid through the pipe line, fails. The valves are constructed so that, upon failure of said motive force, they automatically close. One type of check valve frequently employed in this service is the type commonly known as the pivoted disk type.

A pivoted disk check valve has several features such as low pressure drop, simple construction, low maintenance costs, etc., which favor its employment in this service, particularly in those pipe lines where the flow is normally uniform. However, in those instances where there are fluctuations in fluid flow there frequently results a pronounced hammering of the disk. The disk beats against the limit stop or valve body at high flow rates and beats against the seat at low flow rates. In some instances the hammering is so pronounced as to make the disk valves entirely unsatisfactory.

I have found that by changing the moment of inertia of the disk, with respect to its axis of rotation, without changing the mass of the disk, the said hammering is substantially completely eliminated.

An object of my invention is to provide an improved check valve. Another object of my invention is to provide an improved pivoted disk check valve wherein hammering of the disk is substantially completely eliminated. Another object of my invention is to provide a pivoted disk check valve wherein the moment of inertia of said disk, with respect to its axis of rotation, has been increased without increasing the mass of said disk. Other aspects, objects, and advantages of my invention will be apparent to those skilled in the art upon reading this disclosure.

Thus according to the invention there is provided an improved check valve comprising: a disk member and a seat member, said disk member being adapted to seat in said seat member; shaft means attached to said disk for pivotally suspending said disk within a body member; at least one end of said shaft means extending without said body member; and weight means spaced equally on opposite sides of said extended end of said shaft means to increase the moment of inertia of said disk member with respect to its axis of rotation.

It is to be noted that said balanced weight means are mounted on said shaft means, transverse to the axis of rotation of said shaft means. By thus mounting said weight means the moment of inertia of the disk, which is fixed to said shaft, is increased with respect to its axis of rotation, without increasing the mass of said disk. In other words, the resistance to movement of the disk has been changed, in both directions, by the same amount, because said weight means is balanced with respect to the axis of rotation of said shaft means. Thus movement of the disk, responsive to fluctuations in flow through the pipe line in which it is installed, has been stabilized.

Figure 1:
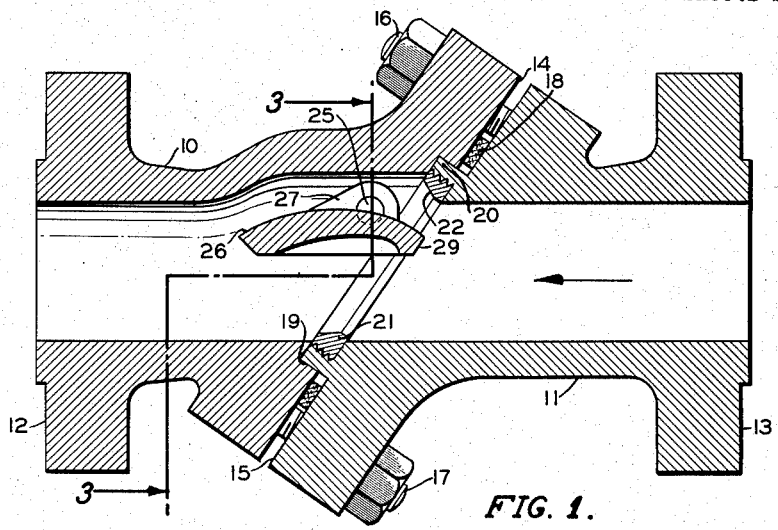
Figure 1 is a longitudinal cross section of a valve according to the invention.

Referring now to the drawings the invention will be more fully explained. As shown in Figure 1 the valve body is divided into a first body member 10 and a second body member 11. Said body members are adapted to be inserted in any kind of pipe line by means of ends 12 and 13, which while illustrated as being flanged, can be of any suitable design. The adjacent ends or faces 14 and 15 are preferably flanged as shown and are adapted to be secured together as by means of bolts 16 and 17. Any number of said bolts can be employed, their purpose being to draw the said body members together when the nuts shown thereon are tightened. Gasket 18, of any suitable material, provides a seal when said faces are drawn together. If desired other sealing means such as a ring and groove joint can be employed. Said body members have passageways therethrough which are in substantial alignment with one another and with the bore of the pipe line when installed.

Said faces 14 and 15 are further adapted to cooperate or coact with each other when drawn together. In the modification shown, the face 14 of first body member 10 has a recess 19 therein for receiving a projection 20 on the face 15 of second body member 11. However, any other suitable modification of faces 14 and 15 can be employed. For example, both of said faces can be recessed for receiving an annular seat member 21 disposed therebetween. It is not essential that said faces 14 and 15 be angularly disposed as shown in the drawing.

Annular seat member 21 is mounted around the passageway through second body member 11 and within the projection 20 which projects or extends from face 15 of said second body member. Said seat member 21 is shown in threaded engagement with projection 20. Obviously it could be merely seated in a recess provided in projection 20, or it could be held in place by welding. Or, as previously stated, said seat member 21 can be disposed between faces 14 and 15, both of said faces having suitable recesses therein for receiving same. Seat member 21 has a beveled ring-like seating surface 22.

Figure 3:
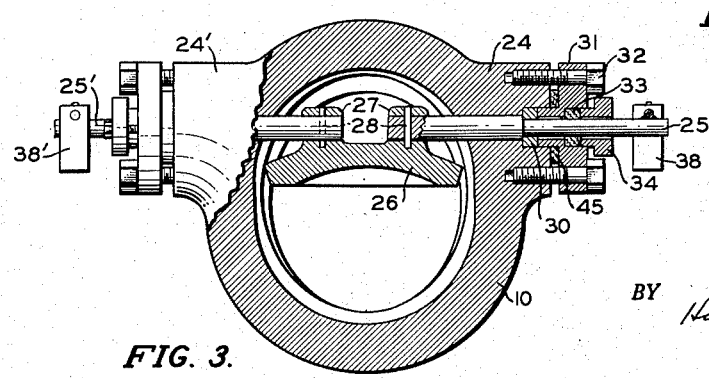
Figure 3 is a sectional view along the line 3—3 of Figure 1 with the disk in open position.

Referring now to Figure 3 it will be noted that first body member 10 is provided with boss members 24 and 24' extending from opposite sides thereof. Shafts 25 and 25' extend from within said body member through said boss members 24 and 24' respectively, to without said body member. A disk member 26 has spaced apart lugs 27 which extend outwardly from the back or downstream side of said disk member. Said lugs 27 receive the inner or adjacent ends of said shafts 25 and 25', as shown, and said shafts are fixed to said lugs as by pins 28, or any other suitable means. Disk 26 is thus pivotally suspended within the passageway of body member 10 on said shafts, which are free to rotate within boss members 24 and 24', in a cooperating position with respect to seat member 21. The inner or upstream face of disk 26 has a beveled ring-like seat 29 (Fig. 1) which is complemental to the beveled seat 22 of seat member 21. It will be noted that the inner ends of shafts 25 and 25′ extend through and are attached to lugs 27 at points above the center of disk 26 and downstream of the cooperating seats 22 and 29. Disk 26 is thus capable of a bell-crank movement and seat 29 readily clears seat 22 without rubbing as said disk tilts or pivots responsive to the force of fluid flowing through the valve assembly in the direction of the arrow shown in Figure 1. As here shown disk 26 is in an open position.

Figure 2:
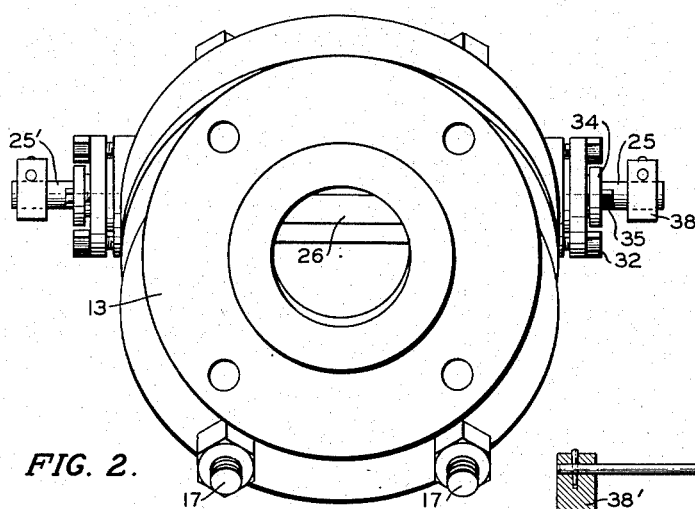
Figure 2 is an end elevation looking in the direction of flow with the disk in open position.

As stated, the outer ends of shafts 25 and 25′ extend outwardly from the passageway through body member 10 and through boss members 24 and 24′ respectively, which form a part of said body member, and through a suitable packing gland assembly. In Figure 3 the packing gland assembly attached to boss member 24′ is the same as that attached to boss member 24. The outer end of shaft 25 is recessed as shown and extends through thrust ring 30, cover plate 31 which is held in place by bolts 32, packing material 33, and packing gland 34. Gland adjusting bolts 35 (Fig. 2), one on each side, are provided to adjust said packing gland. Gasket 45 provides a seal between said boss member and said cover plate.

Figure 4:
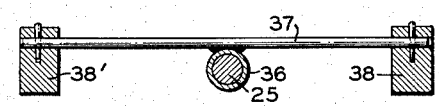
Figure 4 is an illustration of one form of weight means which can be employed according to the invention.

Figure 4 shows a bar assembly which can be employed to mount the balanced inertia weights on the extended portions of shafts 25 and 25′. A ring 36 is positioned on the shaft (here shown as 25) and fastened thereto by any suitable means as by welding. A bar 37 is tack welded to said ring 36, transverse to the longitudinal axis of said shaft, and balanced inertia weights 38 and 38′ are fastened to the ends of said bar by means of the pins shown or any other suitable means. Inertia weights 38 and 38′ are preferably of the same size and mass in order that the assembly will be balanced. However, small differences can be compensated for by moving one of the weights closer to shaft 25. The amount of the moment of inertia of disk 26 is increased can be varied by varying the distance (as well as the mass) weights 38 and 38′ are placed from shaft 25, the axis of rotation of said disk, as will be understood by those skilled in the art. While bar 37 is shown as positioned on one side of ring 36, it will be realized that the assembly can be balanced, with respect to the axis of rotation of shaft 25, by proper positioning of the centers of gravity of the weights 38 and 38′.

Figure 5:
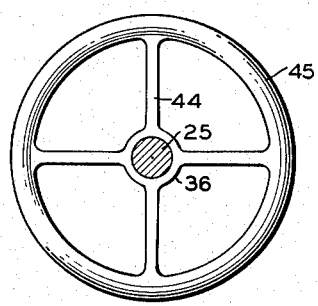
Figure 5 is an illustration of another form of weight means which can be employed according to the invention.

Figure 5 shows another form of weight means which can be employed according to the invention. Said weight means here comprises a ring 36 fixed to a shaft 25 as previously described, spokes or supporting members 44 fixed to and extending outward from the outer circumference of said ring, and a circular weight 45 fixed to the outer ends of said spokes. Said rings 36 and 45, and said spokes 44, are of uniform mass throughout; and said spokes are of equal length. Obviously the balanced weight means of the invention can take other varied forms.

It will be noted that in both Figures 4 and 5 the weight means are mounted on opposite sides of the shaft means and transverse to the axis of rotation of said shaft means. In Figure 4 two separate weights are employed. In Figure 5 a circular weight is employed and for every segment of the ring 45 there is a corresponding segment of equal mass on the opposite side of the shaft.

Figure 6:
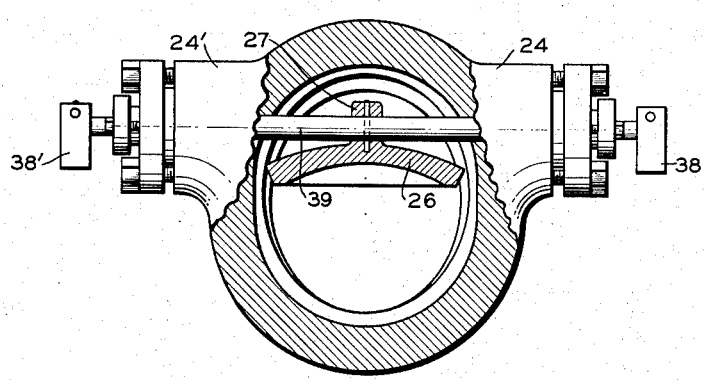
Figure 6 is a sectional view, taken similarly as Figure 3, showing a modification of the valve of the invention.

In Figure 6 there is shown another modification of the invention wherein only one shaft 39 attached to one lug 27 is employed to pivotally suspended disk means 26. The remainder of the elements are like those of Figures 1 and 3.

Figure 7:
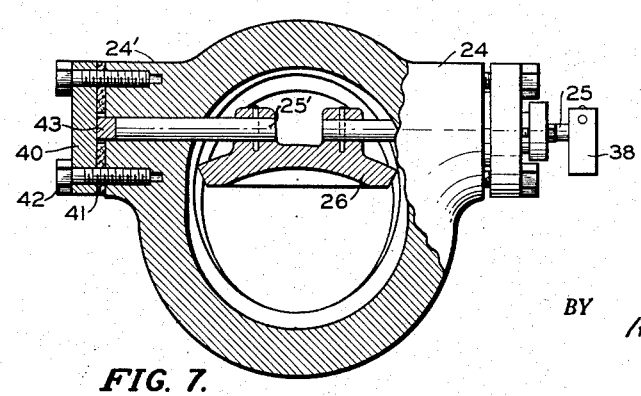
Figure 7 is a sectional view, taken similarly as Figure 3, showing another modification of the invention.

In Figure 7 there is shown still another modification of the invention wherein inertia weights are employed on only one side of the valve. In this modification shaft 25′ extends into boss member 24′ as shown. Said boss member is sealed by means of cover plate 40, gasket material 41, and bolts 42. A thrust ring 43 is employed between the end of shaft 25′ and cover plate 40. All the remaining elements are like those of Figures 1 and 3.

Still another modification would be to employ weights on only one side of the valve in the modification shown in Figure 6.

However, it is generally preferred to employ weights on both sides of the valve because the valve assembly as a whole is better balanced. Of course smaller weights can be employed when weights are installed on both sides of the valve.

Various other modifications of the invention can be made in view of the above detailed disclosure and discussion without departing from the spirit or scope of the invention.

I claim:

1. A check valve comprising, in combination: a disk member and a seat member, said disk member being adapted to seat in said seat member; shaft means attached to said disk for pivotally suspending said disk within a body member; said shaft means extending without said body member on opposite sides thereof; and balanced weight means fixed to and spaced equally on opposite sides of each said extended end of said shaft means to increase the moment of inertia of said disk member with respect to its axis of rotation.

2. A check valve comprising, in combination: a disk member and a seat member, said disk being adapted to seat in said seat member; shaft means attached to said disk for pivotally suspending said disk within a first body member; said shaft means extending without said body member on opposite sides thereof; balanced weight means fixed to each said extended end of said shaft means transverse to the axis of rotation thereof; a second body member; and means for securing said body members together at cooperating adjacent faces.

3. A check valve comprising, in combination: separable first and second body members having a passageway therethrough and cooperating adjacent faces; a seat member and a disk member adapted to seat in and cooperate with said seat member, said seat member being disposed at the junction of said faces around said passageway; shaft means attached to said disk for pivotally suspending said disk in said first body member, said shaft means extending without said body member on opposite sides thereof; balanced weight means mounted on opposite sides of and fixed to each said extended end of said shaft means transverse to the longitudinal axis of said shaft means, so as to increase the moment of inertia of said disk, with respect to its axis of rotation, without increasing the mass of said disk; and means for securing said body members together.

4. A check valve comprising, in combination: separable first and second body members having substantially aligned passageways therethrough and cooperating adjacent faces; means for securing said body members together; an annular seat member mounted in the face of said second body member around the passageway therethrough; a disk adapted to cooperate with and seat in said seat member; shaft means attached to said disk for pivotally suspending said disk, in a cooperating position with respect to said seating member, within the passageway in said first body member, said shaft means extending without said first body member on opposite sides thereof; a bar trans-axially fixed to each said extended outer end of said shaft means; and balanced weights mounted on said bar on opposite sides of said shaft means.

5. A check valve according to claim 3 wherein said shaft means comprises a single shaft, each end of said shaft extends without said first body member on opposite sides thereof; and each extended end of said shaft has balanced weight means mounted thereon.

6. A check valve according to claim 3 wherein said shaft means comprises a first shaft and a second shaft, each attached at one end thereof to said disk and the other end of each of said shafts extends without said first body member on opposite sides thereof; and each extended end of said shafts has balanced weight means mounted thereon.

7. A check valve according to claim 4 wherein said shaft means comprises a first shaft and a second shaft, each attached at one end thereof to said disk and the other end of each of said shafts extends without said first body member on opposite sides thereof; and each extended end of said shafts has balanced weight means mounted thereon.

References Cited in the file of this patent

UNITED STATES PATENTS

| | | |
|---|---|---|
| 1,744,798 | Price | Jan. 28, 1930 |
| 1,804,953 | Roller | May 12, 1931 |
| 2,262,726 | Nickerson | Nov. 11, 1941 |
| 2,501,060 | Leibing | Mar. 21, 1950 |
| 2,588,775 | Smolensky | Mar. 11, 1952 |
| 2,717,001 | Perrault | Sept. 6, 1955 |

FOREIGN PATENTS

| | | |
|---|---|---|
| 242,912 | Germany | Jan. 26, 1912 |